(12) United States Patent
Wantling et al.

(10) Patent No.: US 6,585,820 B2
(45) Date of Patent: Jul. 1, 2003

(54) WATER-RESISTANT GYPSUM FORMULATIONS

(75) Inventors: Steven Joseph Wantling, Brandon, MO (US); Bonnie Sherrard Zepka, Louisville, KY (US)

(73) Assignees: Fleet Capital Corporation, Chicago, IL (US); Fllet Capital Canada Corporation, Chicago, IL (US); Fleet National Bank, London U.K., Branch, Chicago, IL (US)

( * ) Notice: Subject to any disclaimer, the term of this patent is extended or adjusted under 35 U.S.C. 154(b) by 5 days.

(21) Appl. No.: 09/993,196

(22) Filed: Nov. 16, 2001

(65) Prior Publication Data

US 2003/0084825 A1 May 8, 2003

Related U.S. Application Data

(60) Provisional application No. 60/303,635, filed on Jul. 6, 2001.

(51) Int. Cl.$^7$ .................................................. C08J 3/02
(52) U.S. Cl. ........................................ 106/271; 516/77
(58) Field of Search ............................. 516/31, 38, 39, 516/60, 66, 77; 106/270, 271

(56) References Cited

U.S. PATENT DOCUMENTS

| | | |
|---|---|---|
| 3,891,453 A | 6/1975 | Williams |
| 3,935,021 A | 1/1976 | Greve et al. |
| 4,019,920 A | 4/1977 | Burkard et al. |
| 4,042,409 A | 8/1977 | Terada et al. |
| 4,094,694 A | 6/1978 | Long |
| 4,174,230 A | 11/1979 | Hashimoto et al. |
| 4,392,896 A | 7/1983 | Sakakibara |
| 4,421,704 A | 12/1983 | Reily |
| 4,748,196 A | 5/1988 | Kuroda et al. |
| 5,009,269 A | 4/1991 | Moran et al. |
| 5,120,355 A | 6/1992 | Imai |
| 5,482,551 A | 1/1996 | Morris et al. |
| 5,695,553 A * | 12/1997 | Claret et al. ................. 106/778 |
| 5,922,447 A | 7/1999 | Baig |
| 5,968,237 A * | 10/1999 | Sinnige .......................... 106/2 |
| 5,980,628 A | 11/1999 | Hjelmeland et al. |
| 6,010,596 A | 1/2000 | Song |
| 6,162,839 A | 12/2000 | Klauck et al. |
| 6,165,261 A * | 12/2000 | Wantling .................... 106/778 |
| 6,172,122 B1 * | 1/2001 | Lawate et al. .............. 516/109 |

* cited by examiner

*Primary Examiner*—Paul Marcantoni

(57) ABSTRACT

Emulsions are provided which are useful in imparting water resistance to gypsum products. In one embodiment, the emulsions comprise a plurality of waxes, at least one saponified wax, a complexed starch, a polymerized alkyl phenol, and a small amount of a co-surfactant. In another embodiment, the emulsions comprise a single wax, a balanced dual surfactant system, a complexed starch and a polymerized alkyl phenol. Emulsions of this embodiment may be added to hot, even boiling, water without the emulsion separating or curdling. The emulsions of the present invention are stable for extended periods of time when stored at room temperature and do not require the addition of a bactericide. The emulsions of the present invention are pourable liquids at room temperature.

30 Claims, No Drawings

WATER-RESISTANT GYPSUM FORMULATIONS

CROSS-REFERENCE TO RELATED APPLICATIONS

This application claims priority under 35 U.S.C. §119(e) from co-pending U.S. Provisional Application Serial No. 60/303,635, filed Jul. 6, 2001, bearing an identical title.

FIELD OF THE INVENTION

The present invention relates to an additive useful in improving the water-resistance of gypsum products. The present invention also relates to an emulsion which includes an alkyl phenol, a wax, or a combination of waxes, and a complexed starch, the emulsion useful in improving the water resistance of gypsum products. The present invention further relates to a method of making the emulsion.

BACKGROUND OF THE INVENTION

Certain properties of gypsum (calcium sulfate dihydrate) make it very popular for use in making industrial and building products; especially gypsum board. It is a plentiful and generally inexpensive raw material which, through a process of dehydration and rehydration, can be cast, molded or otherwise formed to useful shapes. The base material from which gypsum board is manufactured is the hemihydrate form of calcium sulfate (gypsum), commonly termed stucco, which is produced by the heat conversion of the dihydrate from which the water phase has been removed.

In the making of gypsum board, the gypsum slurry must flow onto a paper substrate. In a continuous process, the slurry/substrate combination is then sized by passing this combination between rollers. Simultaneous with this sizing step, a paper backing is positioned over the sized gypsum slurry. Accordingly, the gypsum slurry must possess sufficient fluidity so that a properly sized gypsum board can be made. Fluidity refers to the ability of the gypsum slurry to flow.

It is also important to the manufacture of gypsum board, that the gypsum slurry be capable of being foamed to a limited extent. Foamability refers to this ability to be foamed. When the gypsum slurry and paper substrate are passed through the sizing rollers, a certain amount of the gypsum slurry must back flow and accumulate in the rollers nip so that a steady flow of gypsum is delivered to the sizing rollers. Foamability is important to this ability of the gypsum slurry to back flow at the rollers nip.

Because of the continuous nature of a gypsum board manufacturing process wherein the gypsum slurry flows onto a substrate which then passes through sizing rollers, the extent to which the gypsum slurry flows after it is sized is critical to maintaining the finished product dimensions of the gypsum board. The time at which the gypsum slurry ceases its flow is referred to as the pre-set time. Therefore, pre-set time is an important property of the gypsum slurry. The set time of the gypsum slurry is also an important property. The set time refers to the amount of time it takes the gypsum slurry to be dried, under heat, to the finished, solid gypsum board. As is well known in the art, in a continuous gypsum board manufacturing process, it is important that the gypsum slurry possess a consistent set time.

Gypsum board absorbs water, which reduces the strength of the wallboard. Prior art products, like ordinary gypsum board, gypsum tile, gypsum block, gypsum casts, and the like have relatively little resistance to water. When ordinary gypsum board, for example, is immersed in water, the board quickly absorbs a considerable amount of water, and loses a great deal of its strength. Actual tests have demonstrated that when a 2 inch by 4 inch cylinder of gypsum board core material was immersed in water at about 70° F., the cylinder showed a water absorption of 36% after immersion for 40 minutes.

Previous attempts to provide water-resistant properties to gypsum board include incorporation of asphalt, metallic soaps, resins, and wax additives into a aqueous gypsum slurry. The resulting materials were difficult to use and the core properties difficult to control. Polysiloxane-based systems have also been used in attempts to impart water-resistance to gypsum board. However, the polysiloxane-based systems are both expensive and difficult to use. A finished gypsum product has also been coated with water resistant films or coatings. One specific example of a past attempt to provide a water-resistant gypsum product is the spraying of a molten paraffin, wax or asphalt into an aqueous gypsum slurry.

Another example of a prior art attempt to provide a water resistant gypsum product is the addition of an emulsion of wax, such as paraffin wax, and asphalt, in the relative proportions of from about 1 part to about 10 parts of asphalt per part of wax to the aqueous gypsum slurry. Since the asphalt is a relatively poor solvent for paraffin wax and similar wax at ordinary temperatures, the solution formed at high temperatures tends on cooling to deposit microscopic wax crystals on the asphalt-wax surface.

Polyvinyl alcohol has been used in an attempt to provide a room temperature system for use in adding water resistant properties to gypsum. However, the polyvinyl alcohol system tends to rapidly separate and thus typically requires continuous mixing prior to use. The inherent instability of the polyvinyl alcohol systems tends to produce stratification of the compounds in the formulation. Therefore, the polyvinyl alcohol systems tend to be compositionally inconsistent. In addition, because of destabilization into different phases, there is also the potential for bacterial growth.

Accordingly, there is a need for an additive which is useful in imparting water-resistance to gypsum products, and which is economical to apply. There is a need for a water-resistance additive which does not require the use of costly components such as polysiloxane. There is a need for a stable, water-resistance additive. There is a further need for a water-resistance additive which is stable at room temperature and which does not require heating prior to application to a gypsum solution. There is still a further need for a stable water-resistance additive which does not require continuous mixing or agitation to maintain its stability. There is yet a further need for a stable water-resistance additive which does not require the addition of a bactericide to control bacterial growth inherent in existing systems. Of course, such additives should perform these functions without affecting fluidity, foamability, pre-set time or set time.

SUMMARY OF THE INVENTION

The present invention, in one embodiment, provides an emulsion which comprises a plurality of waxes, at least one saponified wax, a complexed starch, a polymerized alkyl phenol, and a small amount of a co-surfactant. In another embodiment, the present invention provides an emulsion comprising a single wax, a balanced dual surfactant system, a complexed starch and a polymerized alkyl phenol. Emulsions of this embodiment may be added to hot, even boiling, water without the emulsion separating or curdling. The emulsions of the present invention are stable for extended periods of time when stored at room temperature and do not require the addition of a bactericide. The emulsions of the present invention are pourable liquids at room temperature.

The emulsions of the present invention are useful in imparting water resistance to gypsum products. The emulsions of the present invention also include a fire retardant. The emulsions of the present invention may be used in the manufacture of conventional gypsum board, composites made using gypsum, such as gypsum/fiber composites, and other gypsum products.

The present invention also provides a method by which a single wax emulsion, useful in imparting water resistance to gypsum products, can be manufactured.

DETAILED DESCRIPTION OF THE INVENTION

There is provided in accordance with the principles of the present invention an emulsion which is useful in imparting water-resistance properties to gypsum products. The emulsions of the present invention may be added to mixtures of gypsum and water without adversely affecting properties of the mixture which are necessary to the manufacture of gypsum products such as gypsum board. Such properties include fluidity, foamability and set time.

Preparation of Emulsions

Emulsions were prepared by heating the wax and surfactants ("wax mixture") in one vessel and the water, borate compound and corn starch ("water mixture") in another vessel. Both mixtures were heated, with mixing, to about 185° F. (85° C.). Next, the wax mixture was poured into the water mixture under mixing. The resultant mixture was then placed in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig.

It is preferred that the homogenized mixture be cooled after the homogenization step. It is most preferable that the homogenized mixture be cooled from approximately 185° F. to about 100° F. This may be accomplished by running the homogenized mixture through a cooling coil immersed in water maintained at room temperature.

HLB Values

The hydrophilic/lipophilic balance ("HLB") value describes the relationship of a compound to its solubility in water. An emulsifier having a low HLB value will tend to be oil soluble and one having a high HLB value will tend to be water soluble. Typically, a water soluble emulsifier or blends thereof are used to make an oil/water emulsion typical of those described herein, or to solubilize oils or waxes, or to obtain some measure of detergent action. Thus, the HLB value can be used to describe or select the proper emulsifier or emulsifier system.

Where two or more components are combined, the HLB value of the combination is the weighted average of the individual HLB values. The following formula may be used to calculate the HLB value of a combination of materials:

$$HLB(\text{combined}) = \frac{Q_1 \times (HLB_1) + Q_2 \times (HLB_2) + \ldots Q_n \times (HLB_n)}{Q_1 + Q_2 + \ldots Q_n};$$

where, $Q_1$=weight of material 1; $HLB_1$=HLB value of material 1

$Q_2$=weight of material 2; $HLB_2$=HLB value of material 2

$Q_n$=weight of material n; $HLB_n$=HLB value of material n.

Test Specimens

Test specimens were made by mixing 50 grams of gypsum, 35.97 grams of water, and 1.92 grams of a specified emulsion. For the control, no emulsion was added. Gypsum, water and, if added, emulsion, were mixed together and left to stand for one minute. This mixture was then mixed for an additional 30 seconds. After this second mixing, the specimens were subjected to fluidity testing.

Fluidity Test

The specimens mixed as provided above were poured out onto a flat surface and the diameter of the resulting patty was measured. The diameter of a patty is an index of the fluidity of the specimen. The larger the diameter, the more fluid the specimen.

Foamability Test

The foamability test is used to determine the affect of a wax emulsion on the stability of foam in a gypsum slurry. In this test, 0.60 grams of a commercially available foamant and 2 grams of wax emulsion are weighed out. The foamant and the emulsion are placed into a blender along with 100 grams of water. The mixture is blended for 20 seconds. At the end of this blending step, the foam is immediately poured from the blender cup into a tared 150 ml beaker to overflowing. Any excess is struck off the beaker. Any foam remaining in the blender cup is set aside. The foam density is determined by weighing the foam in the 150 ml beaker. Two minutes after the blending has stopped, any liquid in the remaining foam in the blender cup is drained and discarded. A clean, tared, 150 ml beaker is filled with the remaining foam to overflowing and the excess is struck off. A second foam density is determined as described above. For the emulsions of the present invention, foam densities were acceptable and ranged from about 40 to about 65 grams per 150 ml, for the measurements made at 20 seconds, and from about 10 to about 45 grams per 150 ml, for the measurements made at 2 minutes.

Water Absorption Test

Patties made in the Fluidity Test were dried for at least 24 hours at 110° F. At the end of this time, the patties were weighed and the weight was recorded. The dried patties were then immersed in water for two hours. At the end of the two hour immersion, the patties were weighed and this wet weight was recorded. Percent water retention was then calculated based on the difference between these two recorded weights.

Materials

Waxes useful in making the various embodiments of the present invention may be selected from any of the commercially known waxes which have a melting point of from about 120° F. to about 150°, and preferably from about 135° F. to about 145°. Such waxes are typically of low volatility, exhibiting less than about a 10% loss in weight during standard thermogravimetric analysis. Also, the oil content of these waxes is typically less than about 1% by weight. These waxes are of a relatively high molecular weight, having an average chain length of $C_{36}$, that is a 36 carbon chain length, or greater.

In certain embodiments, it is useful to saponify one or more of the waxes. In this way, the saponified wax functions as an added surfactant. Waxes useful in this respect are limited to waxes having an acid value or a saponification value and a melting point greater than about 180° F. Saponification of such waxes may be accomplished by combining the wax with a strongly basic material such as sodium hydroxide or potassium hydroxide. Waxes which may be saponified in the emulsions of the present invention include montan wax, carnauba wax, beeswax, bayberry-myrtle wax, candelilla wax, caranday wax, castor bean wax, esparto grass wax, Japan wax, ouricury wax, retamo-ceri mimbi wax, shellac, spermaceti wax, sugar cane wax, wool-lanolin wax, and others. The amount of strongly basic material needed to saponify a wax may be calculated based on the saponification value of the wax. For example, the saponification value divided by 1000 equals the grams of potassium hydroxide to add per gram of wax.

Starch used in the emulsions of the present invention is complexed starch. The starch may be complexed in situ, during manufacture of the emulsion, or the starch may be pre-complexed prior to being added to the emulsion. Starch is preferably complexed by mixing the starch with a complexing agent such as a borate compound. A preferred borate compound is sodium tetraborate decahydrate. Other compounds useful in complexing starch include ammonium biborate, ammonium pentaborate, potassium pentaborate, potassium tetraborate, and lithium tetraborate, The starch useful in making the complexed starch of the present invention includes, but is not limited to, corn, rice, wheat, potato, sago and other starches. The ratio of borate complexing agent to starch is important to the functionality of the complexed starch in the emulsions. It has been found that the ratio may be as low as 1:20, of borate to starch on a weight per weight basis, but preferably 1:7. The ratio may be as high as 1:3.5, however it has been found that at this ratio, and higher ratios, a greater amount of complexed starch is needed in the emulsion to maintain the balance of desired properties in the gypsum mixture and final gypsum product. These desired properties include fluidity, foamability, and water resistance.

A co-surfactant may be used in embodiments of the present invention. These co-surfactants are added in small amounts, relative to other components in the emulsion, and are effective in helping to maintain the stability of the emulsion. The co-surfactants include calcium lignosulfonate, sodium lignosulfonate, and trisodium phosphate.

Incorporating alkyl phenols into the emulsions has been found important to achieving low water absorption in the final gypsum product. Such alkyl phenols include long chain, $C_{24}$–$C_{34}$ (from 24 to 34 carbon chain length) polymerized methylene-coupled alkyl phenol, calcium phenates, long branched chain calcium alkyl phenols, long straight chain calcium alkyl phenols and complex polymers of maleic acid with and without an amine group substitution. As used herein, the alkyl phenols are identified by an arbitrary identification number as noted below.

| Identification No. | Description | Source |
|---|---|---|
| 319A | Complex polymer of maleic acid (no amine group substitution) | "Flozol 140" Lubrizol Chem. Corp. Wycliffe, Ohio |
| 319B | Complex polymer of maleic acid (with amine group substitution) | "Flozol 145" Lubrizol Chem. Corp. Wycliffe, Ohio |
| 319C | Straight chain, long chain alkyl phenol | Lubrizol Chem. Corp. Wycliffe, Ohio |
| 319D | Calcium Phenate | Lubrizol Chem. Corp. Wycliffe, Ohio |
| 319E | Branched chain, long chain alkyl phenol | Lubrizol Chem. Corp. Wycliffe, Ohio |
| 319H | $C_{24}$–$C_{34}$ polymerized methylene-coupled alkyl phenol | Lubrizol Chem. Corp. Wycliffe, Ohio |

In certain embodiments which use a single wax additive, it has been found that a dual surfactant system provides a stable emulsion at both room temperature and elevated temperatures. Such stable emulsions may be added, for example, to hot or boiling water, without the emulsion separating or curdling. The dual surfactant system uses a unique ratio of the component surfactants to provide an HLB value within a range of about 8.9 to about 14. It is preferred that the component surfactants each have an HLB value greater than 6. One example of a dual surfactant system of the present invention is a combination of dodecylisopropanolamine benzene sulfonate and a nonionic ethoxylated aryl phenol. Dodecylisopropanolamine benzene sulfonate may be obtained from Unichema, Wilmington, Del. under the trade name SD1121. One nonionic ethoxylated aryl phenol is Ethox 2938, available from Ethox Corp., Greenville, S.C. Alternatively, an alkoxylated fatty acid ester may be combined with the of dodecylisopropanolamine benzene sulfonate to form the dual surfactant system. One alkoxylated fatty acid ester is Ethox 2914, also available from Ethox Corp., Greenville, S.C.

It has also been found that in certain embodiments of the present invention a dispersing aid, or fluidity modifier, is useful for the maintenance of the fluidity of the gypsum/emulsion mixture. Such dispersing agents are strong lipophiles, which are, consequently, good defoamers. One such dispersing agent is poly(oxy-1,2-ethanedyl), alpha-phenyl-omega-hydroxy styrenate.

Multiple Wax Systems

In one embodiment of the present invention, an emulsion is formed by combining and homogenizing two waxes, a co-surfactant, an alkyl phenol and a complexed starch. Table 1 below provides examples of emulsions made according to this embodiment. Also, there is provided results of testing the gypsum/emulsion mixture and gypsum product. All mixtures and homogenizations were made, and tests were performed, as described above.

TABLE 1

MULTIPLE WAX SYSTEMS

| Component/Parameter | Emulsion A | Emulsion B | Emulsion C | Control (no emulsion) |
|---|---|---|---|---|
| (amount of component, grams) | | | | |
| Wax 3816 | 134.0 | 132.0 | 130.0 | |
| Montan Wax | 12.0 | 12.0 | 12.0 | |
| 319H | 10.0 | 4.0 | 6.0 | |
| Sodium lignosulfonate | 4.0 | 4.0 | 4.0 | |
| Water | 239.0 | 237 | 237 | |
| Borax | 1.5 | 1.5 | 1.5 | |
| Corn Starch | 6.5 | 6.5 | 6.5 | |
| KOH | 3.0 | 3.0 | 3.0 | |
| % Water Retained | 1.07 | 7.76 | −0.34 | 33.30 |
| Fluidity | 3 inches | 3.25 inches | 3.25 inches | 4 inches |

Wax 3816 is a hard paraffin wax, available from Honeywell/Astor, Duluth, Ga. In the emulsions described in Table 1, corn starch is complexed with sodium tetraborate decahydrate. Montan wax was saponified in situ by the addition of potassium hydroxide (KOH).

It has been found that the following ranges of component percentages, based on the total weight of the emulsion (% w/w), are useful in embodiments of the multiple wax systems of the present invention.

| Component | % (w/w) |
|---|---|
| Wax | 30–35 |
| Saponified Wax | 3–10 |
| Alkyl Phenol | 0.5–10 |
| Co-surfactant | 0.5–5 |
| Water | 55–65 |
| Starch | 0.25–10 |
| Complexing Agent | 0.25–10 |
| Alkali | 0.5–3 |

The ratio of starch to complexing agent is maintained within the range described above. The actual amount of alkali required to saponify the wax is dependent on the amount of wax and the saponification value of the wax, also as described above.

The beneficial and synergistic effect of the combination of components can be best understood by reference to Table 2 below. In the emulsions described in Table 2, certain components were selectively eliminated from the emulsion formulation. Water absorbance for these emulsions is compared to that for Emulsion C, described in Table 1.

TABLE 2

SYNERGISTIC EFFECT OF EMULSION COMPONENTS

| Component/Parameter | Emulsion C | Emulsion D | Emulsion B | Emulsion E | Control (no emulsion) |
|---|---|---|---|---|---|
| (amount of component, grams) | | | | | |
| Wax 3816 | 130.0 | 132.0 | 132.0 | 132.0 | |
| Montan Wax | 12.0 | 12.0 | 12.0 | 12.0 | |
| 319H | 6.0 | | 4.0 | 4.0 | |
| Sodium lignosulfonate | 4.0 | 4.0 | 4.0 | 4.0 | |
| Water | 237 | 241 | 237 | 243 | |
| Borax | 1.5 | 1.5 | 1.5 | 1.0 | |
| Corn Starch | 6.5 | 6.5 | 6.5 | 1.0 | |
| KOH | 3.0 | 3.0 | 3.0 | 3.0 | |
| % Water Retained | −0.34 | 13.08 | 7.76 | 12.95 | 33.30 |
| Fluidity | 3.25 inches | 3 inches | 3.25 inches | 3.25 inches | 4 inches |

As Table 2 illustrates, comparing Emulsion C and Emulsion D, the omission of the alkyl phenol compound from the emulsion formulation results in a surprising and unexpected increase in water absorption of more than one hundred percent. In other words, the use of the alkyl phenol compound effectively reduces the water absorption of the gypsum product by two orders of magnitude. Also illustrated in Table 2 is the effect of a change in ratio of starch to complexing agent. Comparing the results realized with Emulsion B and Emulsion E, the data shows that a 36 percent reduction in water absorbance can be achieved by varying the starch to complexing agent ratio.

Single Wax Systems

In a further embodiment of the present invention an emulsion is formed by combining and homogenizing a single wax, a dual surfactant system, an alkyl phenol and a complexed starch. Table 3 below provides examples of emulsions made according to this embodiment. Also, there is provided results of testing the gypsum/emulsion mixture and gypsum product. All mixtures and homogenizations were made, and tests were performed, as described above.

TABLE 3

SINGLE WAX SYSTEMS

| Component/Parameter | Emulsion F | Emulsion G | Emulsion H | Control |
|---|---|---|---|---|
| (amount of component, grams) | | | | |
| Wax 3816 | 135.0 | 134.5 | 134.5 | |
| 319H | 4.0 | 4.0 | 4.0 | |
| Ethox 2914 | 14.0 | 12.0 | 12.0 | |
| SD1121 | 4.0 | 4.0 | 4.0 | |
| Water | 240.0 | 240.0 | 240.0 | |
| Borax | 0.5 | 0.5 | 0.5 | |
| Corn Starch | 2.5 | 5.0 | 5.0 | |
| % Water Retained | 1.24 | −0.02 | 3.47 | 33.30 |

As illustrated in Table 3 above, a combination of a single wax, a dual surfactant system, an alkyl phenol and a complexed starch significantly reduces the amount of water absorbed by the gypsum product. In Table 4 below, the effect of varying, or eliminating, certain components from this embodiment is illustrated.

It has been found that the following ranges of component percentages, based on the total weight of the emulsion (% w/w), are useful in embodiments of the single wax systems of the present invention.

| Component | % (w/w) |
|---|---|
| Wax | 33–38 |
| Alkyl Phenol | 0.5–10 |
| First Surfactant of Dual Surfactant System | 0.5–5 |
| Second Surfactant of Dual Surfactant System | 0.5–5 |
| Water | 55–65 |
| Starch | 0.25–10 |
| Complexing Agent | 0.25–10 |

The ratio of starch to complexing agent is maintained within the range described above. The ratio of the first surfactant to the second surfactant in the dual surfactant system is determined based on a combined HLB value of from about 8.9 to about 14, as described above.

TABLE 4

SYNERGISTIC EFFECT OF SINGLE WAX SYSTEM COMPONENTS

| Component/Parameter | Emulsion F | Emulsion I | Emulsion J | Control |
|---|---|---|---|---|
| (amount of component, grams) | | | | |
| Wax 3816 | 135.0 | 140.0 | 130.0 | |
| 319H | 4.0 | | | 10.0 |
| Ethox 2914 | 14.0 | 12.0 | | |
| SD1121 | 4.0 | 4.0 | | |
| Water | 240.0 | 240.0 | 240.0 | |
| Borax | 0.5 | 0.5 | | |
| Corn Starch | 2.5 | 3.5 | | |
| Cationic Surfactant | | | 18.0 | |
| % Water Retained | 1.24 | 49.83 | 24.46 | 33.30 |

As illustrated in Table 4, the elimination of the alkyl phenol compound resulted in a surprising and unexpected increase in the water absorption by the gypsum product. Also, even in the presence of the alkyl phenol compound, elimination of the dual surfactant system resulted in a surprising and unexpected increase in the water absorption by the gypsum product. In Emulsion J, a cationic surfactant was substituted on an equal mass basis for the dual surfactant system.

The single wax systems of this embodiment are useful in a wide range of gypsum product formulations. The systems of this embodiment are particularly useful for addition to hot aqueous gypsum formulations. Where the emulsions of the prior art tend to separate and curdle upon addition to hot aqueous formulations, the single wax systems of this embodiment are stable in such formulations and do not separate or curdle even on addition to boiling water.

A dispersion agent, as identified above, may be added to the single wax systems of this embodiment to improve the fluidity of an emulsion/gypsum/water mixture. The dispersion agent may be added at from about 0.025% to 2.00%, based on the total weight of the emulsion. When used, the dispersion agent is post-added, that is it is added after the emulsion has been formed.

The use of borates or trisodium phosphate in embodiments of the emulsions of the present invention imparts two additional benefits to the gypsum products employing such emulsions. The borates and trisodium phosphate are useful as fire retardant compounds and these compounds are natural biocides. Therefore, incorporation of a fire retardant compound into a gypsum product can present certain advantages to the users of these gypsum products. Also, the emulsions of the present invention do not require the further addition of another biocide to prevent bacterial growth in the emulsions.

There has been disclosed in accordance with the principles of the present invention an emulsion and gypsum product made using such an emulsion. The emulsion is useful in imparting water resistance to the gypsum product. While certain embodiments and best mode of the present invention are described herein, these embodiments are merely illustrative. It will be apparent to those skilled in the art that modifications may be made therein without departing from the spirit of the invention and the scope of the appended claims.

What is claimed is:

1. An emulsion useful in providing water resistance to a gypsum product, the emulsion comprising:
   from about 30 to about 35 weight percent, based on the total weight of the emulsion, a first wax having a melting point of 120° F. or greater;
   from about 3 to about 10 weight percent, based on the total weight of the emulsion, a second wax having a melting point of 180° F. or greater the second wax having a saponification value;
   from about 0.5 to about 10 weight percent, based on the total weight of the emulsion, an alkyl phenol;
   from about 0.5 to about 5 weight percent, based on the total weight of the emulsion, a co-surfactant, selected from the group consisting of sodium lignosulfate, potassium lignosulfate and trisodium phosphate;
   from about 0.5 to about 3 weight percent, based on the total weight of the emulsion, an alkali metal hydroxide;
   from about 55 to about 65 weight percent, based on the total weight of the emulsion, water; and
   from about 0.25 to about 10 weight percent, based on the total weight of the emulsion, a complexed starch;
   wherein the alkali metal hydroxide saponifies the second wax to provide a surfactant.

2. The emulsion of claim 1 wherein the first wax has a melting point of from about 120° F. to about 150° F.

3. The emulsion of claim 1 wherein the alkali metal hydroxide is potassium hydroxide.

4. The emulsion of claim 1 wherein the alkyl phenol is a long chain $C_{24}$–$C_{34}$ methylene coupled alkyl phenol.

5. The emulsion of claim 1 wherein the complexed starch is a complex of sodium tetraborate decahydrate and starch.

6. The emulsion of claim 1 wherein the second wax is present in an amount ranging from about 3 percent to about 10 percent of the total weight of the emulsion.

7. The emulsion of claim 1 wherein the co-surfactant is present in an amount ranging from about 0.5 percent to about 5 percent of the total weight of the emulsion.

8. The emulsion of claim 1 wherein the complexed starch is present in an amount ranging from about 0.5 percent to about 15 percent of the total weight of the emulsion.

9. An emulsion useful in providing water resistance to a gypsum product, the emulsion comprising:
   from about 33 to about 38 weight percent, based on the total weight of the emulsion, of a wax having a melting point of 135° F. or greater;
   from about 0.5 to about 10 weight percent, based on the total weight of the emulsion, an alkyl phenol;
   a dual surfactant system, the dual surfactant system comprising a mixture of two surfactants such that a HLB value of the mixture is from about 8.9 to about 14;

from about 55 to about 65 weight percent, based on the total weight of the emulsion water;

and from about 0.25 to about 10 weight percent, based on the total weight of the emulsion a complexed starch.

10. The emulsion of claim 9 wherein the wax has a melting point of from about 135° F. to about 150° F.

11. The emulsion of claim 9 wherein the alkyl phenol is a long chain $C_{24}-C_{34}$ methylene coupled alkyl phenol.

12. The emulsion of claim 9 wherein the dual surfactant system is a mixture of dodecylisopropanolamine benzene sulfonate and a nonionic ethoxylated aryl phenol.

13. The emulsion of claim 9 wherein the dual surfactant system is a mixture of dodecylisopropanolamine benzene sulfonate and an alkoxylated fatty acid ester.

14. The emulsion of claim 9 wherein the complexed starch is a complex of sodium tetraborate decahydrate and starch.

15. The emulsion of claim 9 further comprising a fluidity modifier.

16. The emulsion of claim 15 wherein the fluidity modifier is poly(oxy-1,2-ethanedyl), alpha-phenyl-omega-hydroxy styrenate.

17. The emulsion of claim 9 wherein the wax is present in an amount ranging from about 33 percent to about 38 percent of the total weight of the emulsion.

18. The emulsion of claim 9 wherein the dual surfactant system is present in an amount ranging from about 1 percent to about 10 percent of the total weight of the emulsion.

19. The emulsion of claim 9 wherein the complexed starch is present in an amount ranging from about 0.5 percent to about 15 percent of the total weight of the emulsion.

20. A method for making an emulsion, the emulsion useful in providing water resistance to a gypsum product, the method comprising:

(a) providing: from about 30 to about 35 weight percent, based on the total weight of the emulsion, a first wax having a melting point of 120° F. or greater;

from about 3 to about 10 weight percent, based on the total weight of the emulsion, a second wax having a melting point of 180° F. or greater, the second wax having a saponification value;

from about 0.5 to about 10 weight percent, based on the total weight of the emulsion, an alkyl phenol;

from about 0.5 to about 5 weight percent, based on the total weight of the emulsion, a co-surfactant selected from the group consisting of sodium lignosulfonate, potassium lignosulfonate and trisodium phosphate;

from about 0.5 to about 3 weight percent, based on the total weight of the emulsion, an alkali metal hydroxide;

from about 55 to about 65 weight percent, based on the total weight of the emulsion, water; and from about 0.25 to about 10 weight percent, based on the total weight of the emulsion, a complexed starch;

(b) mixing the first wax, the second wax, the alkyl phenol and the co-surfactant to provide a first pre-mix;

(c) mixing the alkali metal hydroxide, water and complexed starch to provide a second pre-mix;

(d) combining the first pre-mix and the second pre-mix to provide a mixture; and (e) homogenizing the mixture;

wherein the homogenized mixture contains a distribution of micelles; and wherein the alkali metal hydroxide saponifies the second wax to provide a surfactant.

21. The method of claim 20 wherein the distribution of micelles have a range of micelle diameters from about 0.5 microns to about 2.5 microns.

22. A method for making an emulsion, the emulsion useful in providing water resistance to a gypsum product, the method comprising:

(a) providing: a wax having a melting point of 135° F. or greater;

an alkyl phenol;

water; and a complexed starch;

(b) mixing a plurality of surfactants to provide a dual surfactant system such that the HLB value of the dual surfactant system is from about 8.9 to about 14;

(c) mixing the wax, the alkyl phenol and the dual surfactant system to provide a first pre-mix;

(d) mixing the water and complexed starch to provide a second pre-mix;

(e) combining the first pre-mix and the second pre-mix to provide a mixture; and (f) homogenizing the mixture;

wherein the homogenized mixture contains a distribution of micelles.

23. The method of claim 22 wherein the distribution of micelles have a range of micelle diameters from about 0.5 microns to about 2.5 microns.

24. The method of claim 22 wherein the wax has a melting point of from about 135° F. to about 150° F.

25. The method of claim 22 wherein the alkyl phenol is a long chain $C_{24}-C_{34}$ methylene coupled alkyl phenol.

26. The method of claim 22 wherein the dual surfactant system is a mixture of dodecylisopropanolamine benzene sulfonate and a nonionic ethoxylated aryl phenol.

27. The method of claim 22 wherein the dual surfactant system is a mixture of dodecylisopropanolamine benzene sulfonate and an alkoxylated fatty acid ester.

28. The method of claim 22 wherein the complexed starch is a complex of sodium tetraborate decahydrate and starch.

29. The method of claim 22 further comprising the step of mixing a fluidity modifier with the emulsion.

30. The method of claim 29 wherein the fluidity modifier is poly(oxy-1,2-ethanedyl), alpha-phenyl-omega-hydroxy styrenate.

* * * * *